United States Patent
Gmach et al.

(10) Patent No.: US 9,689,755 B2
(45) Date of Patent: Jun. 27, 2017

(54) TEMPERATURE SENSORS

(71) Applicant: Rosemount Aerospace Inc., Burnsville, MN (US)

(72) Inventors: Matthew J. T. Gmach, Eagan, MN (US); Robert E. Sable, Lakeville, MN (US); John T. Otto, Shakopee, MN (US); Scott Wigen, Lakeville, MN (US)

(73) Assignee: Rosemount Aerospace Inc., Burnsville, MN (US)

(*) Notice: Subject to any disclaimer, the term of this patent is extended or adjusted under 35 U.S.C. 154(b) by 507 days.

(21) Appl. No.: 14/191,800

(22) Filed: Feb. 27, 2014

(65) Prior Publication Data
US 2015/0110154 A1   Apr. 23, 2015

Related U.S. Application Data

(60) Provisional application No. 61/894,285, filed on Oct. 22, 2013.

(51) Int. Cl.
| | |
|---|---|
| *G01K 13/02* | (2006.01) |
| *G01K 17/06* | (2006.01) |
| *G01K 1/12* | (2006.01) |

(52) U.S. Cl.
CPC .................. *G01K 13/028* (2013.01)

(58) Field of Classification Search
CPC   G01K 13/02; G01K 1/12; G01K 1/14; G01K 1/16; G01K 1/18; G01K 17/06
USPC .................... 340/580, 581; 416/61; 73/170.1
See application file for complete search history.

(56) References Cited

U.S. PATENT DOCUMENTS

| | | | | |
|---|---|---|---|---|
| 3,139,751 | A | * | 7/1964 | Kurzrock ................. G01K 1/08 361/161 |
| 5,752,674 | A | * | 5/1998 | Mears ..................... B64D 15/16 244/134 F |
| 6,109,783 | A | * | 8/2000 | Dobler ................... G01J 5/0022 374/131 |
| 6,941,805 | B2 | | 9/2005 | Seidel et al. |
| 6,974,250 | B2 | * | 12/2005 | Severson ............. G01K 13/028 374/138 |
| 7,174,782 | B2 | | 2/2007 | Ice |
| 7,328,623 | B2 | * | 2/2008 | Slagle .................... G01K 13/02 374/E13.006 |
| 7,854,548 | B2 | | 12/2010 | Sandnas et al. |

(Continued)

FOREIGN PATENT DOCUMENTS

| | | |
|---|---|---|
| EP | 1457765 A1 | 9/2004 |
| WO | WO-9425842 A1 | 11/1994 |

OTHER PUBLICATIONS

Extended European Search Report dated May 12, 2015, issued during the prosecution of European Patent Application No. 14189846.0, 6 pages.

*Primary Examiner* — Gail Kaplan Verbitsky
(74) *Attorney, Agent, or Firm* — Locke Lord LLP

(57) ABSTRACT

A temperature sensor includes a sensor body and a wedge extension. The sensor body extends from a sensor base to an opposed sensor tip along a longitudinal axis. The sensor body has a leading edge and opposed trailing edge. The sensor body also has an interior flow passage with an inlet for fluid communication of fluid into the interior flow passage and an outlet for exhausting fluid out from the interior flow passage. The wedge extension is on the sensor body between the sensor tip and the sensor base on the leading edge of the sensor body.

8 Claims, 1 Drawing Sheet

(56) References Cited

U.S. PATENT DOCUMENTS

| | | | |
|---|---|---|---|
| 8,392,141 B2 | 3/2013 | Wigen | |
| 8,864,370 B2* | 10/2014 | Dijon | G01K 13/028 244/134 F |
| 2007/0220984 A1* | 9/2007 | Slagle | G01K 13/02 73/708 |
| 2013/0022076 A1* | 1/2013 | Dijon | G01K 13/028 374/138 |
| 2013/0163636 A1* | 6/2013 | Parsons | G01K 13/028 374/158 |
| 2014/0064330 A1* | 3/2014 | Agami | G01K 13/028 374/138 |
| 2015/0063414 A1* | 3/2015 | Wigen | G01K 13/028 374/138 |
| 2015/0103863 A1* | 4/2015 | Herman | G01K 13/028 374/138 |
| 2015/0103864 A1* | 4/2015 | Schwie | B64F 1/26 374/148 |
| 2016/0115871 A1* | 4/2016 | Slavens | F01D 5/186 60/806 |
| 2016/0377487 A1* | 12/2016 | Cheung | G01K 1/08 374/141 |

* cited by examiner

TEMPERATURE SENSORS

CROSS-REFERENCE TO RELATED APPLICATIONS

This application claims priority to U.S. Provisional Patent Application No. 61/894,285, filed Oct. 22, 2013, which is incorporated by reference herein in its entirety.

BACKGROUND OF THE INVENTION

1. Field of the Invention

The present disclosure relates to temperature sensors, and more particularly to engine temperature sensors, such as those used in aerospace applications.

2. Description of Related Art

Modern jet powered aircraft require very accurate measurement of outside air temperature for inputs to the air data computer, engine thrust management computer, and other airborne systems. Traditional temperature sensors are used at the inlets of gas turbine engines and/or within the engines. One ongoing challenge for temperature measurements is associated with operation at higher Mach numbers. Compressibility effects occurring at higher Mach numbers can alter the desired flow pattern through traditional sensors, with potential reduction in response time, for example if there is reduced flow bathing the actual sensor element.

Another phenomenon, which also presents difficulties, is the effect of high velocity foreign objects being ingested by the engine, e.g. ice. Traditional sensors can include provisions for heating the probe in order to prevent ice formation during icing conditions. Anti-icing performance is facilitated by heater elements embedded in the housing walls. Unfortunately, external heating also heats the internal boundary layers of air which, if not properly controlled, provides an extraneous heat source in the measurement of the temperature. This type of error, commonly referred to as deicing heater error (DHE), is difficult to correct for.

Such conventional methods and systems have generally been considered satisfactory for their intended purpose. However, there is still a need in the art for systems and methods that allow for improved temperature sensor performance, including improved time response at elevated Mach numbers and reduced DHE. The present disclosure provides a solution for these problems.

SUMMARY OF THE INVENTION

A temperature sensor includes a sensor body and a wedge extension. The sensor body extends from a sensor base to an opposed sensor tip along a longitudinal axis. The sensor body has a leading edge and opposed trailing edge. The sensor body also has an interior flow passage with an inlet for fluid communication of fluid into the interior flow passage and an outlet for exhausting fluid out from the interior flow passage. The wedge extension is on the leading edge of the sensor body between the sensor tip and the sensor base.

It is contemplated that the wedge extension can be configured to separate the leading edge into separate portions to reduce the size of ice accumulation on the sensor body. The wedge extension can also be configured to increase a pressure differential between the inlet and the outlet at high Mach numbers, e.g. 0.55 Mach or higher. The sensor body can have an airfoil shape. Further, the sensor body can include a temperature sensor disposed in the interior flow passage. The inlet can be aft of the wedge extension on the tip of the sensor body.

The wedge extension can move the low pressure region farther aft toward the trailing edge relative to respective forward low pressure regions inboard and outboard of the wedge extension along the longitudinal axis. At least a portion of the outlet can be downstream of at least a portion of the wedge extension, relative to the leading edge and the trailing edge, proximate the low pressure region for increasing airflow from the inlet, through the interior flow passage, to the outlet. The outlet can also include a plurality of outlets defined in the sensor body. At least a portion of one of the plurality of outlets can be downstream of at least a portion of the wedge extension with respect to the leading edge and the trailing edge. The wedge extension can move the low pressure as described above.

In accordance with certain embodiments, a sensor includes an airfoil body extending from an airfoil base to an opposed airfoil tip along a longitudinal axis. The airfoil body includes a wedge extension integral to the airfoil body defined between the airfoil tip and the airfoil base. The airfoil body and wedge extension define the leading edge of the airfoil body and the airfoil body defines a trailing edge opposed to the leading edge. The airfoil body has an interior flow passage as described above.

It is contemplated that the airfoil body can have a lower uninterrupted airfoil portion, a middle wedge portion, and a top uninterrupted airfoil portion. The middle wedge portion can be configured to alter airflow downstream of the middle wedge portion, relative to the leading edge and the trailing edge, and leave at least a portion of airflow downstream of each of the lower and top uninterrupted airfoil portions, relative to the leading edge and the trailing edge, unaffected. The wedge extension can be configured as described above relative to ice accumulation and pressure differential at high Mach numbers.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
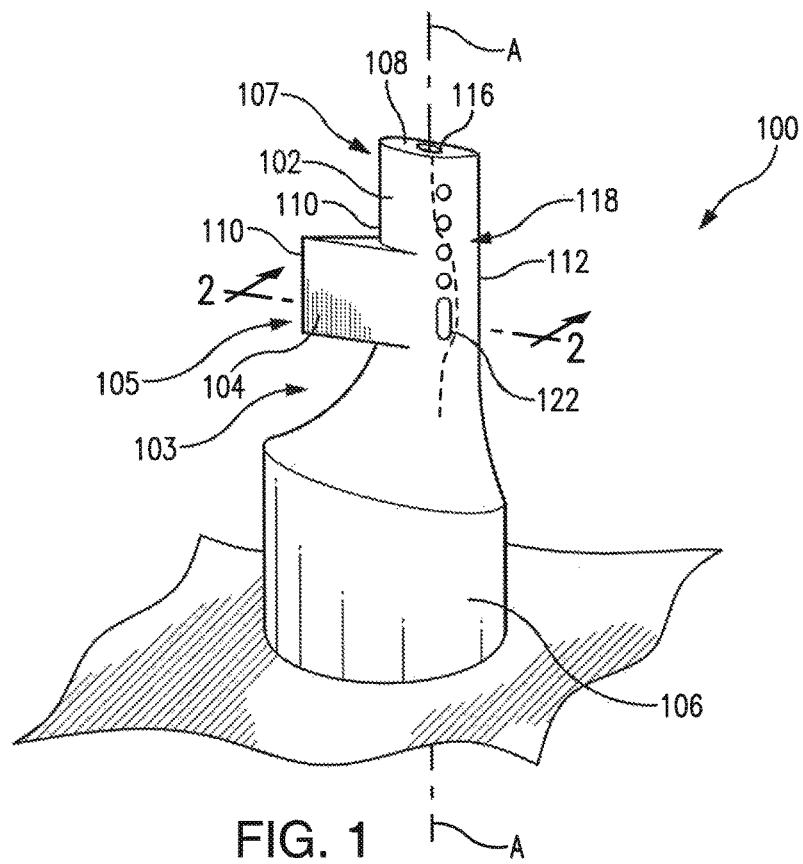
FIG. 1 is a perspective view of an exemplary embodiment of a temperature sensor constructed in accordance with the present disclosure, showing the sensor body and the wedge extension.

Reference will now be made to the drawings wherein like reference numerals identify similar structural features or aspects of the subject disclosure. For purposes of explanation and illustration, and not limitation, a perspective view of an exemplary embodiment of a temperature sensor in accordance with the disclosure is shown in FIG. 1 and is designated generally by reference character 100. Other embodiments of temperature sensors in accordance with the disclosure, or aspects thereof, are provided in FIG. 2, as will be described. The systems and methods described herein can be used for temperature measurements, for example in aerospace applications.

As shown in FIG. 1, a temperature sensor 100 includes a sensor body 102, e.g. an airfoil. Sensor body 102 includes wedge extension 104 integral to sensor body 102 defined between a sensor tip 108 and sensor base 106. Sensor body 102 and wedge extension 104 define a leading edge 110 of sensor body 102 and sensor body 102 defines a trailing edge 112 opposed to leading edge 110. Wedge extension 104 is configured to separate leading edge 110 into separate portions to reduce the size of ice formations accumulated on sensor body 102. Those skilled in the art will readily appreciate that by reducing the size of ice formations, the size of the ice pieces ingested by an engine, for example, is also reduced, therein reducing damage to the engine due to large ice pieces. In addition, those skilled in the art will readily appreciate that deicing heaters are not required on sensor body 102 to reduce ice accumulation because of wedge extension 104, therein eliminating deicing heater error for the temperature sensor 120, shown in FIG. 2, and reducing energy costs. In certain applications, however, it is contemplated that deicing heaters can be used.

With continued reference to FIG. 1, sensor body 102 has a lower uninterrupted sensor portion 103, e.g. a lower uninterrupted airfoil portion, a middle wedge portion 105, and a top uninterrupted sensor portion 107, e.g. a top uninterrupted airfoil portion. Wedge extension 104 is configured to alter airflow, e.g. by moving the low pressure region as describe below, downstream of middle wedge portion 105, relative to leading edge 110 and trailing edge 112, and leave at least a portion of airflow downstream of each of the lower and top uninterrupted sensor portions, 103 and 107, respectively, relative to leading edge 110 and trailing edge 112, unaffected. Sensor body 102 is shown as an airfoil, however, those skilled in the art will readily appreciate that there are a variety of suitable sensor body shapes, for example a truncated airfoil shape.

Figure 2:
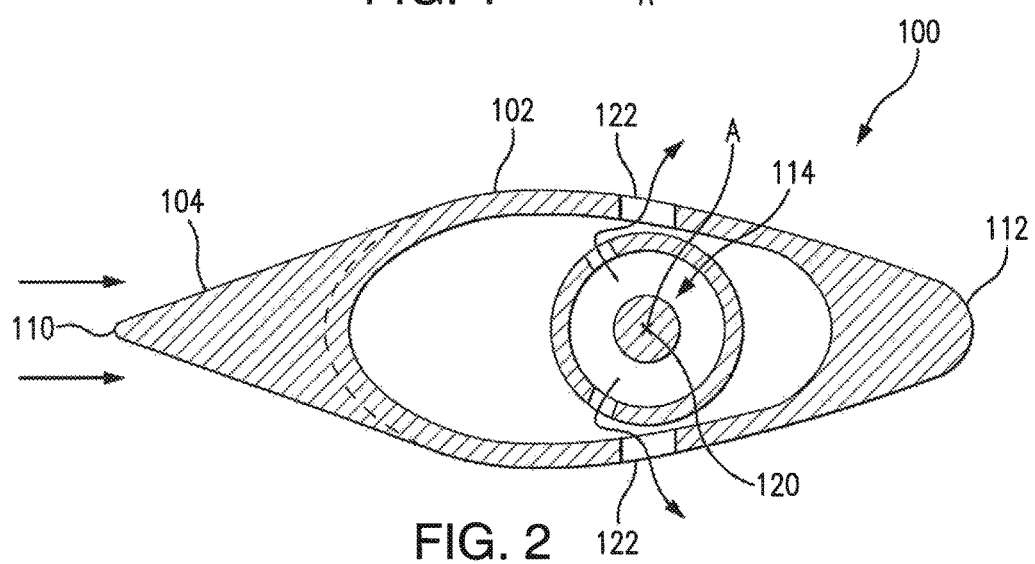
FIG. 2 is a cross-sectional view of the temperature sensor of FIG. 1, schematically showing the air flow through the sensor body and showing the temperature sensor within the interior flow passage.

As shown in FIG. 2, sensor body 102 also has an interior flow passage 114 connected to an inlet 116 for fluid communication of fluid into interior flow passage 114 and a plurality of outlets 118 for exhausting fluid out from interior flow passage 114. Sensor body 102 includes a temperature sensor 120 disposed in interior flow passage 114. Some of the outlets 118 are downstream of wedge extension 104, relative to leading edge 110 and trailing edge 112. As indicated schematically by the dashed line of FIG. 1, those skilled in the art will readily appreciate that at high Mach numbers, e.g. above 0.55 Mach, downstream of wedge extension 104, the low pressure region is farther aft on the sensor body 102 relative to respective forward low pressure regions inboard and outboard of the wedge extension, such as those low pressure regions aft of lower and top uninterrupted sensor portions, 103 and 107, respectively. This develops a low pressure region proximate at least one of the plurality of outlets 118, therein increasing airflow from inlet 116, through interior flow passage 114, to outlets 118, as indicated schematically by arrows in FIG. 2.

Those skilled in the art will readily appreciate that at high Mach numbers, the compressibility effects can alter the desired flow pattern through traditional sensors, resulting in potential reduction in response time, for example, if there is reduced flow bathing temperature sensor 120. By moving the low pressure region farther aft on sensor body 102, wedge extension 104 increases the pressure differential between inlet 116 and outlet 118 at high Mach numbers, e.g. 0.55 Mach or higher, and therein increases air flow over the temperature sensor 120, helping to maintain the response time of temperature sensor 120.

As shown in FIGS. 1 and 2, one of the plurality of outlets 118 is an elongated outlet 122 downstream of wedge extension 104. Those skilled in the art will readily appreciate that the elongated outlet can take full advantage of the low pressure region created by the wedge extension 104, therein increasing the pressure differential and the airflow through interior flow passage 114. Those skilled in the art will readily appreciate that sensor body can include a single outlet 118 or a plurality as is shown and described herein. It is contemplated that there are a variety of suitable shapes for outlets 118, such as, circular, elliptical, or oval.

While shown and described in the exemplary context of air flow, those skilled in the art will readily appreciate that temperature measurements are exemplary only. Similar measurements can be made for any other suitable fluid using the techniques described herein without departing from the scope of this disclosure.

The methods and systems of the present disclosure, as described above and shown in the drawings, provide for temperature sensors with superior properties, including improved time response at elevated Mach numbers, reduced damage to the engine due to ice ingestion and improved DHE, relative to traditional sensors. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A temperature sensor comprising:
   a sensor body extending from a sensor base to an opposed sensor tip along a longitudinal axis and defining a leading edge and opposed trailing edge, wherein the sensor body defines an interior flow passage with an inlet for fluid communication of fluid into the interior flow passage and an outlet for exhausting fluid out from the interior flow passage; and
   a wedge extension defined on the sensor body between the sensor tip and the sensor base on the leading edge of the sensor body, wherein the wedge extension is positioned to move a low pressure region aft relative to respective forward low pressure regions inboard and outboard of the wedge extension along the longitudinal axis, wherein at least a portion of the outlet is downstream of at least a portion of the wedge extension, relative to the leading edge and the trailing edge, proximate the low pressure region for increasing airflow from the inlet, through the interior flow passage, to the outlet.

2. A temperature sensor as recited in claim 1, wherein the outlet includes a plurality of outlets defined in the sensor body.

3. The temperature sensor of claim 2,
   wherein at least a portion of one of the plurality of outlets is downstream of at least a portion of the wedge extension, relative to the leading edge and the trailing edge, proximate the low pressure region for increasing airflow from the inlet, through the interior flow passage, to the outlet.

4. A temperature sensor as recited in claim 1, further comprising a temperature sensor disposed in the interior flow passage.

5. A temperature sensor comprising:
an airfoil body extending from an airfoil base to an opposed airfoil tip along a longitudinal axis, the airfoil body including a wedge extension integral to the airfoil body defined between the airfoil tip and the airfoil base, the airfoil body and wedge extension defining the leading edge of the airfoil body, wherein the airfoil body defines a trailing edge opposed to the leading edge and an interior flow passage with an inlet for fluid communication of fluid into the interior flow passage and an outlet for exhausting fluid out from the interior flow passage, wherein the wedge extension is positioned to alter airflow downstream of the wedge extension, relative to the leading edge and the trailing edge, and leaves at least a portion of airflow downstream of each of the lower and top uninterrupted airfoil portions, relative to the leading edge and the trailing edge, unaffected.

6. A temperature sensor as recited in claim 5, further comprising a temperature sensor disposed in the interior flow passage.

7. A temperature sensor as recited in claim 1, wherein the wedge extension is integrally and monolithically formed with the sensor body.

8. A temperature sensor as recited in claim 5, wherein the wedge extension is integrally and monolithically formed with the airfoil body.

\* \* \* \* \*